United States Patent
Otsuji et al.

(10) Patent No.: US 6,810,553 B1
(45) Date of Patent: Nov. 2, 2004

(54) DISPOSABLE BRUSH

(75) Inventors: Kazuya Otsuji, Tochigi (JP); Masayuki Okawa, Tochigi (JP); Yasuki Tsutsumi, Tochigi (JP); Kaoru Hamada, Tokyo (JP); Jun Yamamoto, Tochigi (JP); Keiichiro Sugai, Tochigi (JP); Yoshiaki Kumamoto, Tochigi (JP); Kenichi Otani, Tochigi (JP); Hidesato Kizaki, Tokyo (JP)

(73) Assignee: Kao Corporation, Tokyo (JP)

( * ) Notice: Subject to any disclaimer, the term of this patent is extended or adjusted under 35 U.S.C. 154(b) by 0 days.

(21) Appl. No.: 09/508,540

(22) PCT Filed: May 21, 1999

(86) PCT No.: PCT/JP99/02690

§ 371 (c)(1),
(2), (4) Date: Apr. 7, 2000

(87) PCT Pub. No.: WO99/62370

PCT Pub. Date: Dec. 9, 1999

(30) Foreign Application Priority Data

| May 29, 1998 | (JP) | 10-149041 |
| Oct. 5, 1998 | (JP) | 10-282689 |
| Oct. 5, 1998 | (JP) | 10-282690 |
| Dec. 25, 1998 | (JP) | 10-371607 |

(51) Int. Cl.[7] .............. A46B 5/04; A47L 13/19; A47K 7/03
(52) U.S. Cl. ............ 15/227; 15/104.94; 15/187; 15/210.1
(58) Field of Search .............. 15/227, 104.93, 15/104.94, 210.1, 187

(56) References Cited

U.S. PATENT DOCUMENTS

| 1,113,054 A | * | 10/1914 | Sadler |
| 1,851,811 A | * | 3/1932 | Christie |
| 2,419,896 A | * | 4/1947 | Hobelmann |
| 2,710,982 A | * | 6/1955 | Gillem |
| 3,116,574 A | * | 1/1964 | Ciesielski |
| 3,151,346 A | * | 10/1964 | Gray |
| 4,741,941 A | * | 5/1988 | Englebert |
| 5,349,715 A | * | 9/1994 | Lewis, Jr. |
| 5,429,854 A | * | 7/1995 | Currie |
| 5,505,720 A | * | 4/1996 | Walters |
| 5,524,575 A | * | 6/1996 | Lennon |
| 6,132,841 A | * | 10/2000 | Guthrie |

FOREIGN PATENT DOCUMENTS

| AT | 256031 | | 8/1967 |
| JP | 63-115333 | * | 7/1988 |
| JP | 04-036906 | | 3/1992 |
| JP | 04-190725 | | 7/1992 |
| JP | 6-003268 | | 1/1994 |
| JP | 06-066367 | | 9/1994 |
| JP | 09-135728 | | 5/1997 |
| JP | 10-272082 | | 10/1998 |

* cited by examiner

*Primary Examiner*—Randall Chin
(74) *Attorney, Agent, or Firm*—Oblon, Spivak, McClelland, Maier & Neustadt, P.C.

(57) ABSTRACT

A disposable brush which is formed of a non-woven fabric or of a pulp of molding. The disposable brush includes a base and a number of projections formed on a first side of the base by allowing portions of the base to project therefrom.

34 Claims, 4 Drawing Sheets

DISPOSABLE BRUSH

BACKGROUND OF THE INVENTION

1. Field of the Invention

The present invention relates to a highly practical and inexpensive disposable brush which can be produced easily.

2. Discussion of the Background

Various types of brushes made of paper or fiber have been proposed (Japanese Utility Model Lad-Open Nos. 66367/94 and 36906/92, Japanese Patent Laid-Open No. 135728/97, and Japanese Utility Model Laid-Open No. 69910/87).

The brush described in Japanese Utility Model Laid-Open No. 66367/94 has bristles coated with fiber and is relatively difficult to produce. The brush disclosed in Japanese Utility Model Laid-Open No. 36906/92 comprises bristles made of a nonwoven fabric of ultrafine fibers and other parts made of other materials, which is structurally complicated and relatively expensive. These brushes are not disposable. The brush described in Utility Model Laid-Open No. 69910/87 is a paper-made disposable brush but of low practical use due to insufficient strength.

These brushes have no considerations for water absorption while used. An example known as a brush having water absorption is one made of pulp which is prepared by punching out from paperboard. However, being a comb rather than a brush, this has a smaller contact area with an object to be brushed than a brush having a number of projections (bristles) on a plane and is inferior in brushing performance.

SUMMARY OF THE INVENTION

Accordingly, an object of the present invention is to provide a highly practical and inexpensive disposable brush which can be produced easily.

Another object of the invention is to provide a disposable brush which has excellent brushing performance and high water absorption irrespective of an object of brushing.

The present invention accomplished the above objects by providing a disposable brush formed of a nonwoven fabric or of a pulp molding which comprises a base and a number of projections formed on one side of the base by allowing portions of the base to project.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings.

DESCRIPTION OF THE PREFERRED EMBODIMENTS

Figure 1:
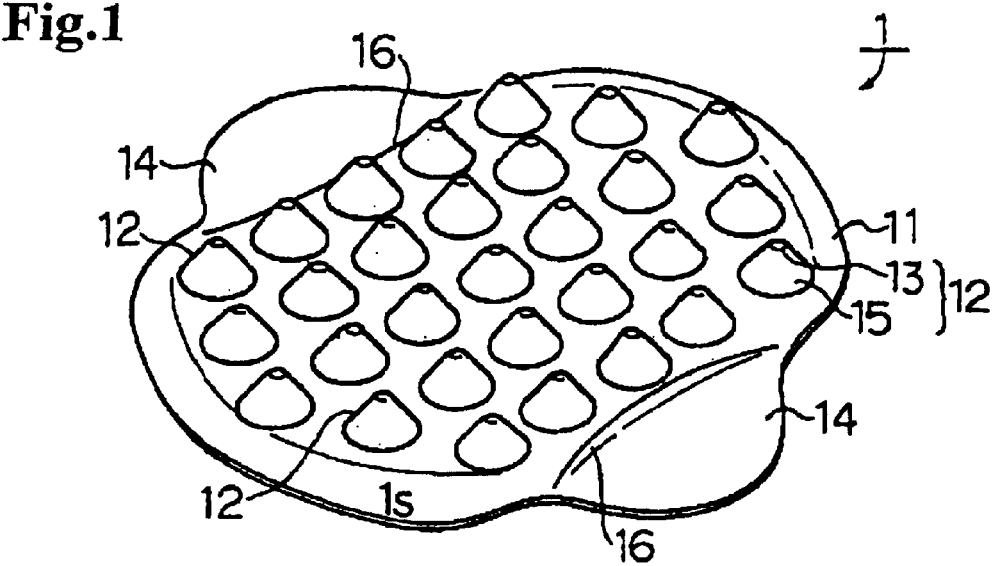
FIG. 1 is a perspective view showing a first embodiment of the disposable brush according to the present invention.
Figure 2:
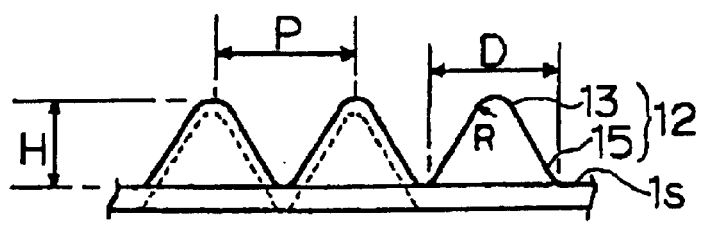
FIG. 2 is an enlarged side view of a part of the projections of the disposable brush according to the first embodiment.
Figure 3:
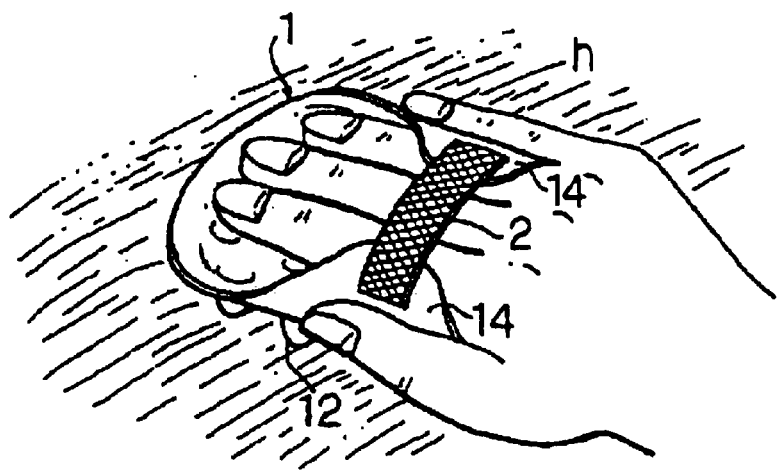
FIG. 3 is a perspective view illustrating a way of using the disposable brush according to the first embodiment.

The preferred embodiments of the disposable brush according to the present invention will be described by referring to the drawings. FIG. 1 is a perspective view showing the disposable brush according to the first embodiment. FIG. 2 is an enlarged side view showing a part of the projections of the disposable brush according to the first embodiment. FIG. 3 is a perspective view illustrating a way of using the disposable brush according to the first embodiment.

As shown in FIG. 1, the disposable brush 1 according to this embodiment is formed of a single piece of a nonwoven fabric or of a pulp molding and comprises a base 11 having on its side 1s a number of projections 12 which are formed by allowing portions of the base 11 to project.

The base 11 has, in its plane view, a rounded rectangular shape with the center of each longer side extending outward to form a nearly semicircular flap 14. The surface 1s of the base 11 has a level difference 16 on the boundary between each flat 14 and the projections 12 in parallel to the longer sides so that the flaps 14 may easily be folded toward the reverse side of the surface 1s.

As shown in FIG. 2, a plurality of rows of equally spaced projections 12 are formed on the surface 1s in the longitudinal direction of the base 11 by allowing portions of the base 11 to project. The rows are arranged in such a manner that the projections 12 may not adjoin each other in the width direction of the base 11. As shown in FIG. 2, the projections 12 has a mountain shape of a size. Where the brush 1 is made of a nonwoven fabric, the projections 12 are hollow. When it is made of a pulp molding, the projections 12 are solid.

The nonwoven fabric forming the brush 1 includes spun lace nonwoven, spun bond nonwoven, suction nonwoven, heat bond nonwoven, melt blown nonwoven, and needle punch nonwoven. The nonwoven fabric preferably has a basis weight of 50 to 500 g/m$^2$, particularly 200 to 300 g/m$^2$.

Fibers making up the nonwoven fabric include a fiber of polyethylene (PE), polypropylene (PP), polyethylene terephthalate (PET) or polyamide (PA), mixed fibers comprising two or more of these fibers, and conjugate fibers having a core/sheath structure, a side-by-side structure, etc. made of these fibers. Conjugate fibers having a core/sheath structure arc preferred from the viewpoint of projection formability and high bulkiness. In order to provide the projections with proper compressive strength, the fibers making up the nonwoven fabric preferably have a fineness of 1 to 100 denier.

Pulp used for a pulp molding which forms the brush 1 includes single or mixed natural fibers of softwood, hardwood, grass, rice plants, reeds, and so forth. To impart moderate strength to the brush, the fibers preferably have a length of 0.2 to 40 mm. Pulp products circulating on the general market, including pulp sheets such as paperboards and regenerated paper, and pulp blocks, can be reused.

The pulp molding is obtained by molding a raw material composition mainly comprising pulp through prescribed means. In order for the raw material composition to be shaped, it usually contains an adhesive, etc. for fiber fixing.

The adhesive to be used includes natural adhesives such as starch and synthetic resin adhesives such as a vinyl acetate resin. The adhesive is applied in a usual manner by, for example, adding directly to the pulp slurry or by dipping a brush in an adhesive solution. The adhesive is preferably used in an amount of 2% by weight or less, particularly 1% by weight or less, based on the solid content of the pulp slurry.

In order to improve the strength of the brush, it is preferred to use, as a pulp material, a mixture of the above-described natural fibers and an appropriate amount of synthetic fibers (binder fibers) such as polyethylene fiber. In this case, the binder fiber is preferably one capable of developing thermal fusion (adhesion) in a drying and pressing step customarily conducted in pulp molding. In using, for example, polyethylene fiber as a binder fiber, it is preferably used in an amount of 10 to 70% by weight, particularly 30 to 50% by weight, based on the dry weight of the brush 1 according to the present embodiment. Other additives can be used appropriately according to the use of, or performance properties required of, the brush.

As shown in FIG. 3, the disposable brush 1 of this embodiment has its flaps 14 connected to each other via Magic Tape (registered trade mark) 2, etc. so that a user can use it as fixed to a hand to stroke hair h of an animal or of a carpet, etc. The Magic Tape 2 may have its end fixed to only one of the flaps 14.

The above-described disposable brush 1 can be impregnated with various liquid medicines or chemicals for brushing. The disposable brush 1 impregnated with a liquid medicine will apply the liquid medicine to the skin, hair or hair bulbs to produce various effects according to the kind of the medicine. The applicable medicines include hair growers, hair dyes, bactericides, deodorants, shampoos, and the like.

Where the projections of the disposable brush 1 are hallow, the hollows may be filled with a separate member to improve the compressive the projections 12.

In the disposable brush 1 of the present embodiment, it is preferred for the projections 12 to have a maximum compression load of 1 N or more, particularly 3 to 15 N, against compression from the top 13 toward the foot 15. Having a maximum compression load of 1 N or more, the projections 12 are prevented from deforming during brushing so that the feel of the projections 12's reaching the skin is not impaired. The "deformation of the projections" herein referred to means that the projections are collapsed during use of the brush, hardly restoring their original shape elastically, and the "feel of the projections' reaching the skin" herein referred to means that the projections are felt to touch the skin to give a moderate massage when used for, for example, brushing the hair of the head.

The maximum compression load was measured according to the following method. Tensilon RTM25 manufactured by Orientec K.K. was used. A load-strain curve was obtained by using a load cell (maximum load: 50 N) under a compression condition of 100 mm/min in head speed The first peak to occur after the commencement of the measurement was taken as the maximum compression load of the projection (the maximum load the projection can withstand). The measurements made on 10 individual projections (n=10) were averaged.

To give the feel of hair's being groomed, to make the liquid medicine reach the roots of hairs or the skin, and to secure the strength, it is preferred for the projections 12 to have a height H of 3 to 50 mm, particularly 3 to 30 mm, especially 5 to 20 mm, most preferably 10 to 20 mm. The language "the feel of hair's being groomed" means the feel of hair's being groomed with moderate resistance by brushing.

It is preferred for the projections 12 to have their top 13 rounded with a curvature radius R of 0.5 to 2.5 mm, particularly 1 to 1.5 mm. With the curvature radius R falling within the above range, there is no fear that brushing may cause pain to the skin or the projections may have insufficient strength. The above preferred curvature radius is also preferred for obtaining the feel of the projections' reaching the skin and for making the liquid medicine reach the roots of hairs or the skin.

From the standpoint of rigidity and the feel of the hair's being groomed, the projections 12 preferably have a diameter D, at their foot 15, of from 3 to 20 mm, particularly 5 to 15 mm, especially 7 to 12 mm.

The projections 12 are preferably formed at a density of 2 to 40, particularly 3 to 20, per 10 $cm^2$ on the surface 1s. The pitch P of the projections 12 will be defined necessarily by the size and density of the projections 12 and preferably ranges 5 to 22 mm, particularly 10 to 18 mm. The above-described preferred density of the projections 12 is favored for the feel of hair's being brushed, for the liquid medicine to reach the roots of hairs and the skin, and for forming the projections to a prescribed height.

Since the disposable brush 1 according to this embodiment is formed of a nonwoven fabric or of a pulp molding, it is easy to manufacture and inexpensive. Being disposal, it is hygienic. Where in particular the brush 1 is formed of a pulp molding, it has high water absorption.

Even though the projections 12 are made of a nonwoven fabric or of a pulp molding, the disposable brush 1 of this embodiment keeps sufficient strength and secures a sufficient contact area with an object of brushing to carry out efficient brushing.

Formed of a nonwoven fabric or of a pulp molding, the disposable brush 1 of the present embodiment is suitable to brush or groom furry animals such as dogs and cats, the hair of the head, carpets, and furs.

The brush 1 of the present embodiment can have the projections designed to have an arbitrary height in accordance with the use. Therefore, it performs excellent brushing function for not only general objects of brushing, such as the hair of the head and furs, but objects covered with thick fur, such as certain kinds of dogs and cats.

The disposable brush of this embodiment can be produced by, for example, the following method.

In case where the brush 1 is formed of a nonwoven fabric, fibers are cut and carded into a web by a carding machine, and the web is passed through heat rolls to make a nonwoven fabric.

The resulting nonwoven fabric is slit to an appropriate width and pressed between male and female molds to form a plurality of projections 12 and level differences 16 for each disposable brush. The pressing is preferably carried out at a mold temperature of 120 to 200° C. under a pressing pressure of 0.5 to 20 $kgf/cm^2$ for a pressing time of 3 to 15 seconds.

The thus pressed nonwoven fabric is cut to the shape of the base 11 so as to have the projections 12 and the level differences 16 as positioned in accordance with the plane view of the present embodiment to obtain the disposable brush 1 of the present embodiment.

Where the brush 1 is formed of a pulp molding, brush 1 is preferably produced by a pulp molding method. A pulp sheet as a raw material, such as a paperboard, is dissolved in water to make a slurry. The slurry can be used as such but is preferably beaten to provide a brush with moderate strength. The beaten pulp preferably has a freeness of 300 to 800 ml particularly 400 to 700 ml. Where an adhesive and the like are used, they are added to the slurry after beating.

The resulting slurry is poured into a paper mold shaped to the pulp-made brush 1 of the present embodiment to form a pulp layer, molding and dehydrating the pulp layer, and dry pressing the pulp molding between male and female molds to obtain the brush 1 of the embodiment.

The second and the third embodiments of the disposable brush according to the present invention will be described by referring to FIGS. 4 through 10. The same description as given to the first embodiment applies appropriately to the matter not explained hereinafter. The same reference numerals as used in FIGS. 1 to 3 are used for the same members in FIGS. 4 to 10.

Figure 4:
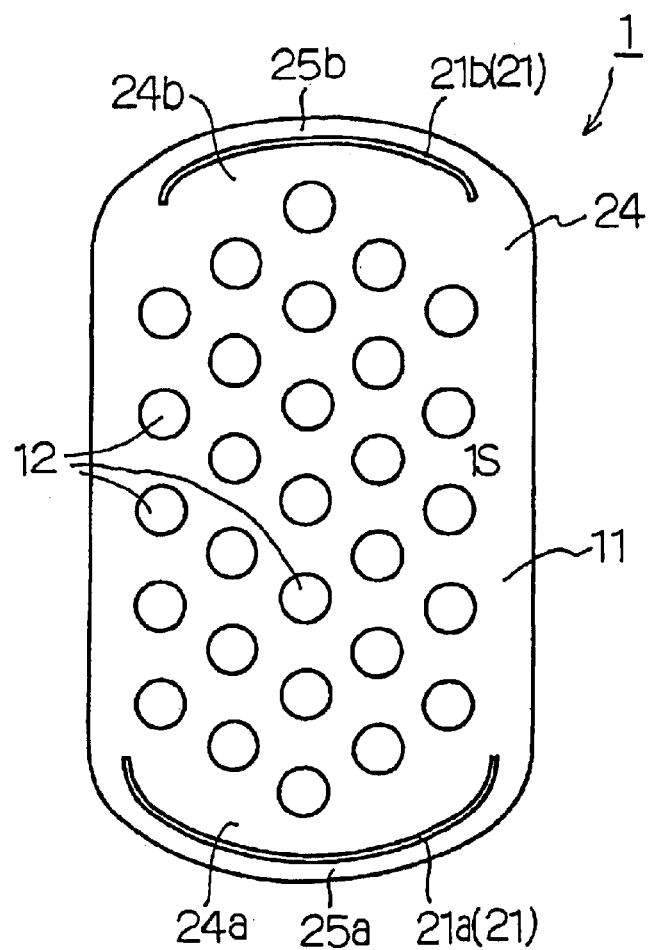
FIG. 4 is a plane view illustrating a surface of a second embodiment of the disposable brush according to the present invention.

The disposable brush 1 of the second embodiment shown in FIG. 4 has slits 21 cut in the, peripheral portion of the base 11 made of a nonwoven fabric so that a user may hold the brush 1 by means of the slits 21.

The base 11 is rectangular, and the slits 21 are made in the peripheral portions 24a and 24b at the longitudinal ends of the base 11. Thus, in the disposable brush 1 according to this embodiment, the projections 12 are formed, leaving a margin on both ends, in the longitudinal direction, of the base 11.

The slit 21a in the peripheral portion 24a on one end 25a makes an arc along the shape of that end over almost the whole width of the base 11, while the slit 21b in the peripheral portion 24b on the other end 25b also makes a similar arc but is shorter than the slit 21a in the peripheral portion 24a. It is preferable that the slit 21 be provided on both ends of the brush 1 in the above-described manner. The ratio of the length of one slit 21a to the other slit 21b is preferably in the range of from 1:0.4 to 0.8.

Figure 5:
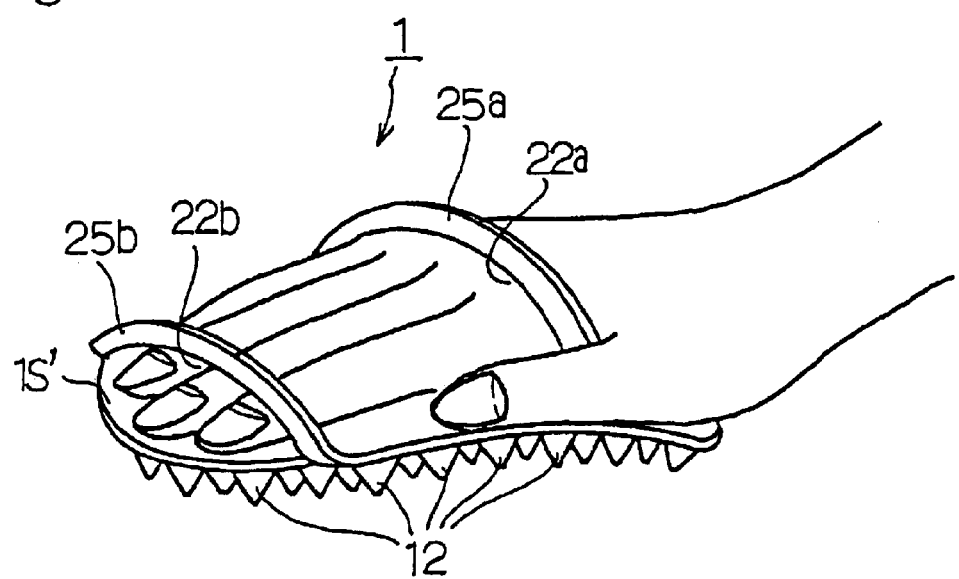
FIG. 5 is a perspective view illustrating the way of using the disposable brush shown in FIG. 4.

The disposable brush 1 according to this embodiment can be used like a general brush in the following manner. As shown in FIG. 5, the ends 25a and 25b, which are free bands by the slits 21a and 21b, are lifted up on the other side 1s' to make openings 22a and 22b. A user can slide a hand (fingers) from the side of the opening 22a to hold the brush 1. The brush 1 is usable by either the right or the left hand or may be held by a holding tool, etc. Handled in this manner, the brush 1 is easy to hold and use. In particular, where the brush 1 is made of a single piece of nonwoven fabric as in this embodiment, the ease of use is further improved.

Figure 6:
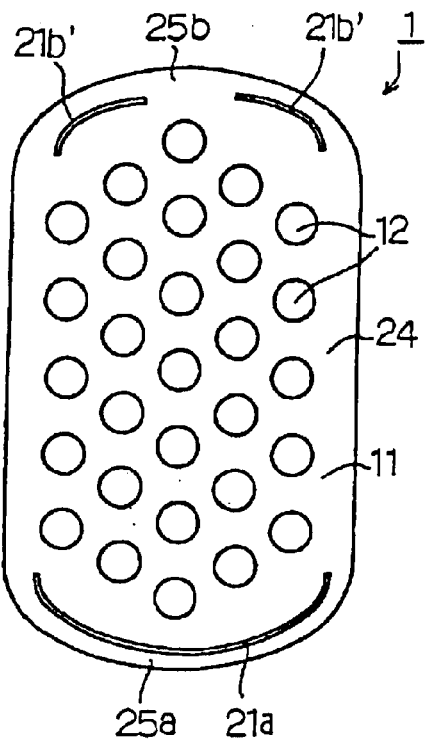
FIG. 6 is a plane view of another example of the second embodiment (corresponding to FIG. 4).

The disposable brush 1 according to the embodiment shown in FIG. 6 has two short slits on the end 25b; the left-hand slit 21b' and the right-hand slit 21b'. On use, fingers are slid through the slits 21b'.

Figure 7:
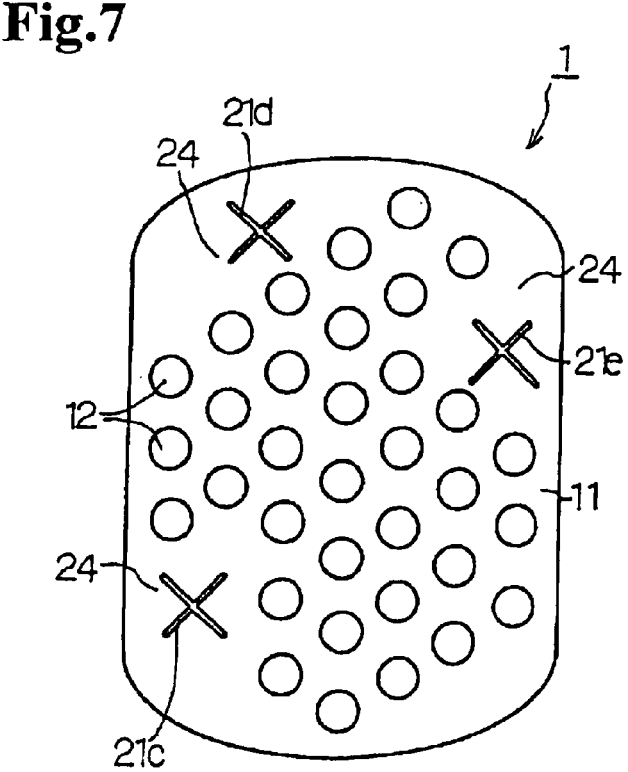
FIG. 7 is a plane view of still another example of the second embodiment (corresponding to FIG. 4).

The disposable brush 1 of the embodiment shown in FIG. 7 has cross slits. In detail, slits 21c, 21d, and 21e are cut in the peripheral portion 24 where no projections are formed. On use, fingers are slid through the slits 21c, 21d, and 21e to hold and use the brush 1. The brush of this particular embodiment is for the right hand, and it is convenient for a user to slide the thumb finger through the slit 21c, the forefinger through the slit 21d, and the third finger through the slit 21e.

While the second embodiment described above has been illustrated with particular reference to examples in which a slit is cut in both ends in the longitudinal direction, the slit may be made on only one of the ends or on the periphery of the shorter sides. The material making the brush is not limited to a nonwoven fabric and may be pulp.

Figure 8:
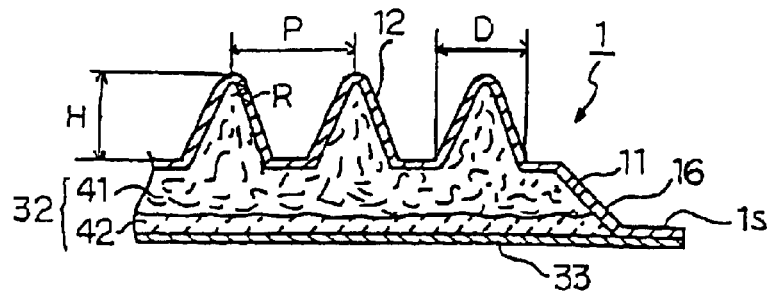
FIG. 8 is an enlarged cross-sectional view of a third embodiment of the disposable brush according to the present invention.
Figure 9:
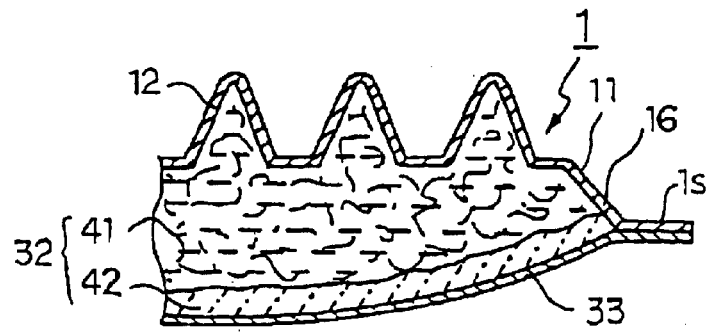
FIG. 9 is an enlarged cross-sectional view, corresponding to FIG. 8, of the disposable brush according to the third embodiment after use.

The disposable brush according to the third embodiment is made of a nonwoven fabric. As shown in FIG. 8, it has a water-retaining member 32 provided on the reverse side of the base 11. The outer surface of the water-retaining member 32 is covered with a cover sheet 33. The water-retaining member 32 comprises pulp 41 and a water-absorbent polymer 42. The pulp 41 is arranged in contact with the reverse side of the base 11, and the absorbent polymer 42 is disposed between the pulp 41 and the cover sheet 33.

As shown in FIG. 8, the water-retaining member 32 is provided to fill the inside of the projections 12, with its outer surface covered with the cover sheet 33. The periphery of the cover sheet 33 is fixed to the reverse side of the flaps 14 with an adhesive, etc. The pulp 41 constituting the water-retaining member 32 is arranged in contact with the reverse side of the base 11, and the absorbent polymer 42 is provided between the pulp 41 and the cover sheet 33.

The pulp 41, inclusive of the part filling the inside of the projections 12, is preferably applied to the reverse side of the base 11 to have a basis weight of 0.02 to 0.6 g/cm$^2$, particularly 0.1 to 0.3 g/cm$^2$. The packing density of the pulp 41 is preferably in a range of 0.01 to 0.12 g/cm$^3$, particularly 0.05 to 0.6 g/cm$^3$. The absorbent polymer 42 is preferably applied to the inside of the cover sheet 33 to have a basis weight of 0.002 to 0.04 g/cm$^3$, particularly 0.004 to 0.01 g/cm$^2$.

The water-retaining member 32 can be of pulp, absorbent polymers, clay, or a like material. In particular, materials employed in disposable diapers and sanitary napkins are useful as the pulp 41 and the absorbent polymer 42 with no particular restrictions.

The cover sheet 33 is to cover and hold the water-retaining member 32 provided in the hollows on the reverse side of the base 11. The cover sheet 33 is preferably of PE, PP, polyvinyl chloride, etc.

The brush 1 according to this embodiment is produced by placing the base 11 with its reverse side up, filing the hollows on the reverse side with a predetermined amount of the pulp 41, applying a prescribed amount of the absorbent polymer 42 thereon, covering the surface of the absorbent polymer 42 with the cover sheet 33, and fixing the periphery of the cover sheet 33 to the back side of the flaps 14 of the brush 1 with an adhesive, etc.

The brush 1 according to this embodiment exerts the following actions and effects while used. When, for example, wet hair of the head is brushed with the brush 1 of the embodiment as held by hand with the projections 12 touching the skin, the water quickly passes the projections 12 and are absorbed by the pulp 41. The water content absorbed by the pulp 41 is then absorbed by the highly absorbent polymer 42 disposed in contact with the pulp 41. As a result, the pulp 41 restores water absorbing capacity and continues absorbing water through the projections 12. This action lasts until the water absorbing capacity of the absorbent polymer 42 approaches saturation. As the water absorption of the water-retaining member 32 increases, the absorbent polymer 42 swells, and the brush 1 assumes the state shown in FIG. 9. Even in this state, since the water-retaining member 32 is covered and supported by the cover sheet 33, the water-retaining member 32 having absorbed and retained water does not hinder the use of the brush 1.

Besides having the function of a brush, the brush 1 according to this embodiment possesses not only water absorbing properties but slow-releasing properties, i.e., properties of gradually transferring a water content and the like held in the brush to a dry object. Therefore, the nonwoven fabric-made brush having the water-retaining member 32 impregnated with various liquid medicines will be used effectively as a skin care brush, a dry shampoo brush, a hair dyeing brush, a hair growing brush, a scalp care brush, and so on.

The kind and amount of the water-retaining member 32 used in this embodiment are subject to appropriate alteration according to the use. By properly selecting the shape of the brush 1 and the kind and arrangement of the water-retaining member 32, the cover sheet 33 could be omitted, or the cover sheet 33 and the method of fixing it could be altered appropriately.

The brush 1 of this embodiment exhibits high water absorption and slow-releasing properties in addition to the brushing function. Therefore, it is suited for use as a quick drying brush for pets such as dogs and cats, carpets, furs and for the hair of the head. Where impregnated with various liquid medicines, the brush achieves brushing while producing the effects of the liquid medicines applied.

The disposable brush according to the present invention is not limited to the above-described embodiments, and various modifications can be given thereto without departing from the spirit and scope of the present invention.

For example, the size of the base 11, which is designed to the size of a human's hand in the above embodiments, can be varied appropriately according to the use.

The projections 12, which are arranged on the surface 1s of the base 11 at regular intervals, may be arranged in various ways including a random arrangement.

The projections 12, which are of the same shape and size, may be sawtooth-shaped or pyramid-shaped as well as mountain-shaped and may be of different sizes.

Figure 10:
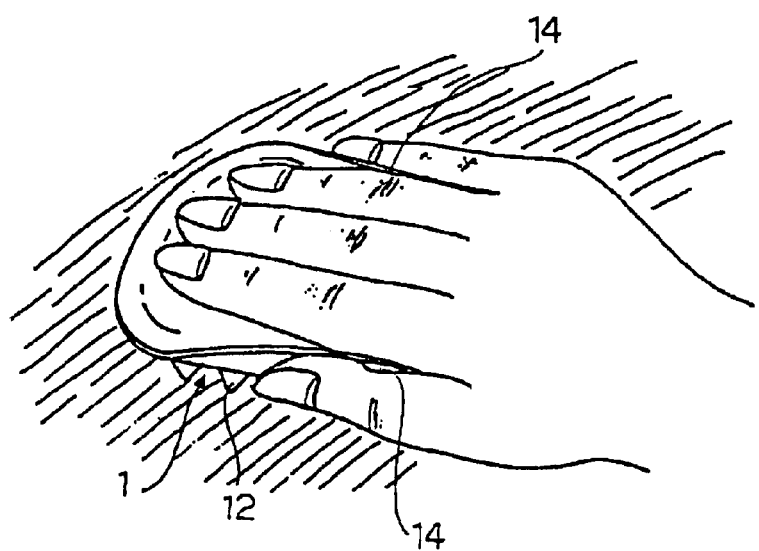
FIG. 10 is a perspective view illustrating another way of using the disposable brush according to the present invention (corresponding to FIG. 3).

Without the Magic Tape shown in FIG. 3, the brush 1 of the above-described embodiments may be used as illustrated in FIG. 10. That is, a hand is applied to the reverse side of the base 11 in parallel with the longer side, and the flaps 14 are folded to the reverse side with the thumb finger and the little finger attached to the surface side 1s of the flaps 14 each arranged in the center of the loner side.

The disposable brush of the present invention can be produced by methods other than the above-mentioned one.

The aforementioned embodiments are interchangeable.

EXAMPLES

Examples of the disposable brush according to the present invention are summarized in Table 1.

TABLE 1

|  | Example | | |
|---|---|---|---|
|  | 1 | 2 | 3 |
| Maximum Compression Load (N) | 10 | 15 | 5 |
| Height of Projections (mm) | 10 | 20 | 10 |
| Top Curvature Radius (mm) | 1 | 1 | 1.5 |
| Pitch of Projections (mm) | 16 | 16 | 22 |
| Diameter of Projection Foot (mm) | 12 | 12 | 12 |
| Basis Weight of a Nonwoven Fabric (g/m$^2$) | 250 | 350 | 250 |
| Evaluation Feel of hair's being groomed | B | B | C |
| Feel of projections' reaching the skin | A | A | B |
| Deformation of projections during use | A | B | B |

All the brushes of Examples 1 to 3 were prepared by cutting a piece of appropriate size from a nonwoven fabric made of core/sheath conjugated fibers comprising polyethylene terephthalate (PET) as a core and a polyethylene terephthalate/polypropylene mixture as a sheath and forming the cut piece between male and female molds at a mold temperature of 120 to 200° C. under a pressing pressure of 0.5 to 20 kgf/cm$^2$ for a pressing time of 3 to 15 seconds.

The evaluation of Examples in Table 1 was made as follows.

[Method of evaluating the feel of hair's being groomed, the feel of the projections' reaching the; skin, and the deformation of the projections during use]

Each of the disposable brushes of Examples 1 to 3 was used by 10 test users to brush their hair and rated on the following basis: poor=1; rather poor=2; rather good=3; good=4. The points allotted to each brush were added up and graded as follows: 4 to 12=C; 13 to 21=B; 22 to 30 or more=A.

Another series of Examples of the disposable brush according to the present invention are shown in Table 2 below.

TABLE 2

|  | Example | | |
|---|---|---|---|
|  | 4 | 5 | 6 |
| Maximum Compression Load (N) | 4.2 | 8.3 | 10.7 |
| Top Curvature Radius (mm) | 1.5 | 1.5 | 2 |
| Height of Projections (mm) | 11 | 15 | 20 |
| Pitch of Projections (mm) | 10 | 14 | 17 |
| Diameter of Projection Foot (mm) | 4 | 7 | 10 |
| Density of Brush (g/m$^3$) | 0.1 | 0.12 | 0.15 |
| Evaluation Feel of hair's being groomed | A | A | B |
| Feel of projections' reaching the skin | B | A | A |
| Deformation of projections during use | B | B | B |

The brushes of Examples 4 to 6 were prepared by a pulp molding method as follows. Pulp having a freeness of 450 ml was prepared from chemical pulp as a pulp material. A polyamideamine epichlorohydrin resin was added as an adhesive to the pulp in a slurry form in an amount of 0.1% by weight based on the solid content of the pulp slurry. The resulting slurry was poured into a mold of the respective shape to form a pulp layer, molding and dehydrating the pulp layer, and dry pressing the pulp molding between male and female molds at a mold temperature of 70 to 120° C. under a pressing pressure of 2 to 10 kg/cm$^2$ for a pressing time of 30 to 120 minutes.

The disposable brush according to the present invention is easy to produce, inexpensive, hygienic, and of high practical use.

Having a number of projections with sufficient strength and height on its surface, the brush of the present invention is suitable for brushing animals covered with fur, such as dogs and cats, the hair of the head, carpets, furs, and the like, and, in particular, suited to even those objects covered with thick fur. The brush of the present invention formed of a pulp molding has high water absorption and is therefore suitable used as a quick drying brush. When impregnated with various liquid medicines, the brush makes it possible to perform brushing while producing the effects of the medicines.

What is claimed is:

1. A disposable brush formed of a nonwoven fabric or of a pulp molding which comprises a base and a number of projections formed on one side of said base by allowing portions of said base to project, wherein said base is a sheet base and has a slit in the peripheral portion thereof so that said brush can be held by hand by means of said slit.

2. This disposable brush as set forth in claim 1, wherein said base is rectangular and said slit is cut in the width direction of said base in the peripheral portion on each end of said base in the longitudinal direction thereof.

3. The disposable brush as set forth in claim 1, wherein said slit is a cross slit and made in three positions.

4. A disposable brush formed of a nonwoven fabric or of a pulp molding which comprises a base and a number of projections formed on one side of said base by allowing portions of said base to project, wherein a water-retaining member is provided on the reverse side of said base, and wherein said water-retaining member comprises pulp and a water-absorbent polymer, and the outer surface of said water-retaining member is covered with a cover sheet.

5. A brush, formed of at least one of a non-woven fabric or a pulp molded product, comprising:

a base formed of a single layer; and a plurality of projections formed on a surface of the base, wherein the plurality of projections is formed from portions of the base that protrude from the surface of the base, and wherein the base has a height toward a center portion that is greater than a height toward a peripheral portion, wherein the non-woven fabric includes at least one of a spun lace non-woven, a spun bond non-woven, a suction non-woven, a heat bond non-woven, a melt blown non-woven, and a needle punch non-woven.

6. The brush according to claim 5, wherein each of the plurality of projections is hollow.

7. The brush according to claim 5, wherein at least one of the plurality of projections is filled with a strengthening member.

8. The brush according to claim 5, wherein the non-woven fabric has a basis weight of approximately 50 g/m$^2$ to approximately 500 g/m$^2$.

9. The brush according to claim 5, wherein the non-woven fabric includes at least one of a polyethylene, a polypropylene, a polyethylene terephthalate, and a polymide.

10. The brush according to claim 9, wherein the non-woven fabric has a fineness of approximately 1 denier to approximately 100 denier.

11. The brush according to claim 5, wherein the pulp molded product includes at least one of a softwood, a hardwood, a grass, a rice plant, a reed, a paperboard, a regenerated paper, and a pulp block.

12. The brush according to claim 11, wherein the pulp molded product includes fibers having a length of approximately 0.2 mm to 40 mm.

13. The brush according to claim 11, wherein the pulp molded product includes an adhesive.

14. The brush according to claim 13, wherein the adhesive includes at least one of a starch and a synthetic resin.

15. The brush according to claim 14, wherein the synthetic resin includes a vinyl acetate resin.

16. The brush according to claim 13, wherein the adhesive is used in an amount of approximately 2% by weight, based on a solid content of a pulp slurry used to form the pulp molded product.

17. The brush according to claim 5, wherein the pulp molded product includes a binder fiber.

18. The brush according to claim 17, wherein the binder fiber includes a fiber capable of developing thermal fusion during drying and pressing of the pulp molded article.

19. The brush according to claim 18, wherein the binder fiber includes a polyethylene fiber.

20. The brush according to claim 5, further comprising adjustable flaps on at least two sides of the base.

21. The brush according to claim 5, wherein the base is impregnated with a chemical.

22. The brush according to claim 21, wherein the chemical includes a medicine.

23. The brush according to claim 5, wherein the shape of each of the plurality of the protrusions includes a frustrum of a cone.

24. The brush according to claim 5, wherein the plurality of protrusions has a maximum compression load of at least 1 N.

25. The brush according to claim 5, wherein the plurality of protrusions are formed at a density between approximately 2 and approximately 40 per 10 cm2 on the surface of the base.

26. The brush according to claim 5, wherein a pitch of the plurality of projections is between approximately 5 mm and approximately 22 mm.

27. The disposable brush as set forth in claim 5, wherein a water-retaining member is provided on the reverse side of said base.

28. The disposable brush as set forth in claim 27, wherein said water-retaining member comprises pulp and a water-absorbent polymer, and an outer surface of said water-retaining member is covered with a cover sheet.

29. A brush, formed of at least one of a non-woven fabric or a pulp molded product, comprising:

a base formed of a single layer; and a plurality of projections formed on a surface of the base, wherein the plurality of projections is formed from portions of the base that protrude from the surface of the base, and wherein the base has a height toward a center portion that is greater than a height toward a peripheral portion, wherein the non-woven fabric has a basis weight of approximately 50 g/m$^2$ to approximately 500 g/m$^2$.

30. A brush, formed of at least one of a non-woven fabric or a pulp molded product, comprising:

a base formed of a single layer; and a plurality of projections formed on a surface of the base, wherein the plurality of projections is formed from portions of the base that protrude from the surface of the base, wherein the base has a height toward a center portion that is greater than a height toward a peripheral portion, and wherein the non-woven fabric includes at least one of a polyethylene, a polypropylene, a polyethylene terephthalate, and a polymide.

31. The brush according to claim 30, wherein the non-woven fabric has a fineness of approximately 1 denier to approximately 100 denier.

32. A brush, formed of at least one of a non-woven fabric or a pulp molded product, comprising:
- a base formed of a single layer; and
- a plurality of projections formed on a surface of the base,
- wherein the plurality of projections is formed from portions of the base that protrude from the surface of the base,
- wherein the base has a height toward a center portion that is greater than a height toward a peripheral portion,
- wherein the pulp molded product includes at least one of a softwood, a hardwood, a grass, a rice plant, a reed, a paperboard, a regenerated paper, and a pulp block,
- wherein the pulp molded product includes fibers having a length of approximately 0.2 mm to 40 mm,
- wherein the pulp molded product includes an adhesive, and
- wherein the adhesive includes at least one of a starch and a synthetic resin.

33. The brush according to claim 32, wherein the synthetic resin includes a vinyl acetate resin.

34. A brush, formed of at least one of a non-woven fabric or a pulp molded product, comprising:
- a base formed of a single layer; and
- a plurality of projections formed on a surface of the base,
- wherein the plurality of projections is formed from portions of the base that protrude from the surface of the base,
- wherein the base has a height toward a center portion that is greater than a height toward a peripheral portion,
- wherein the pulp molded product includes a binder fiber,
- wherein the binder fiber includes a fiber capable of developing thermal fusion during drying and pressing of the pulp molded article, and
- wherein the binder fiber includes a polyethylene fiber.

* * * * *